March 7, 1944.   F. G. PARNELL   2,343,698
BRAKING SYSTEM FOR VEHICLES
Filed Sept. 24, 1941   4 Sheets-Sheet 1

Inventor:
F. G. Parnell
By: Sterns & Davis
Attys.

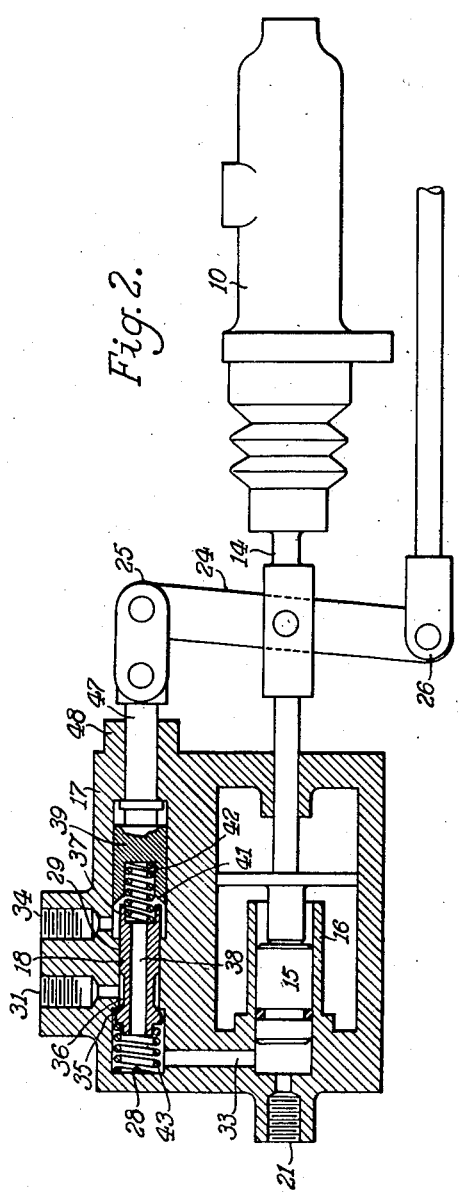
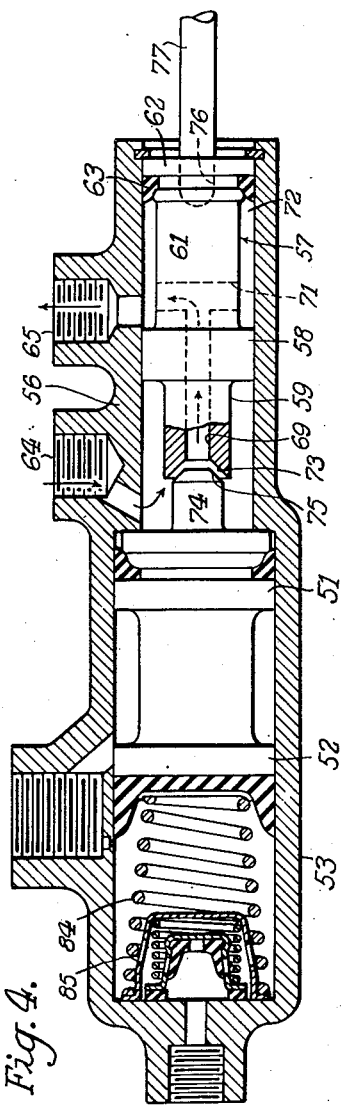

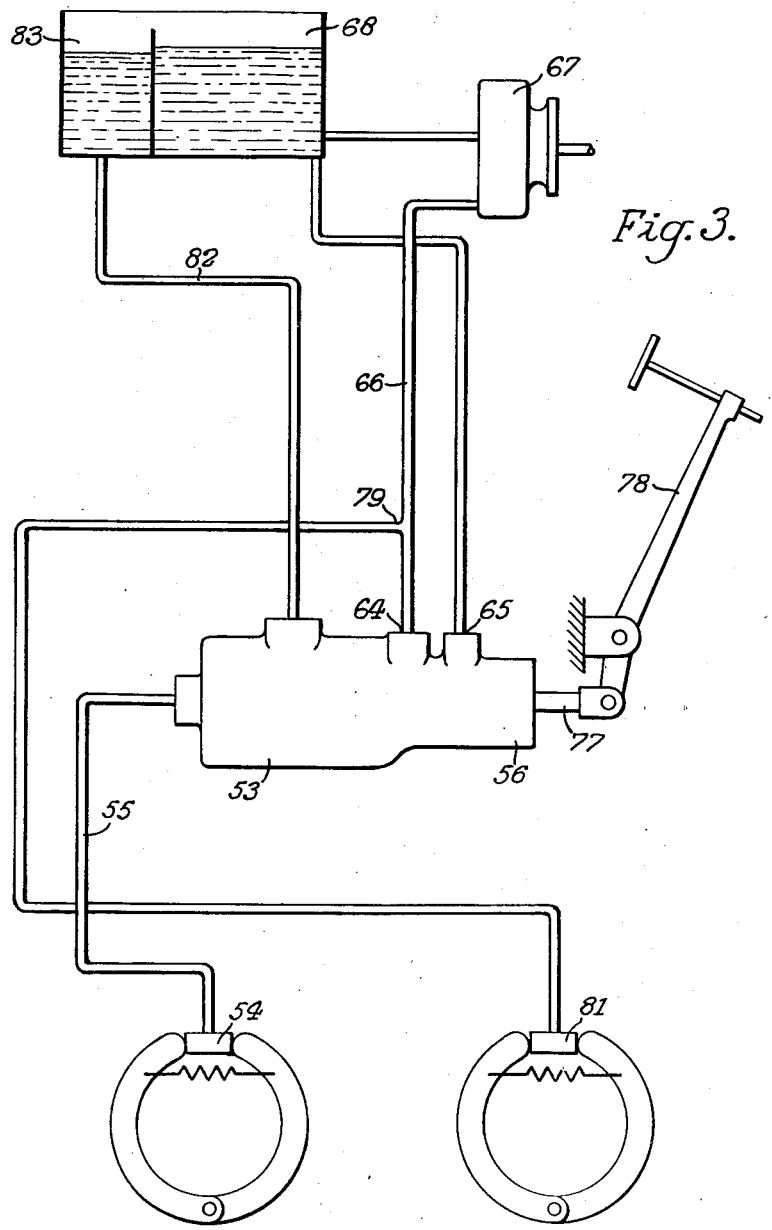

March 7, 1944. F. G. PARNELL 2,343,698
BRAKING SYSTEM FOR VEHICLES
Filed Sept. 24, 1941 4 Sheets-Sheet 4

Inventor:-
F. G. Parnell
By Stevens & Davis
Attys.

Patented Mar. 7, 1944

2,343,698

UNITED STATES PATENT OFFICE 2,343,698

BRAKING SYSTEM FOR VEHICLES

Frank Gordon Parnell, Leamington Spa, England, assignor to Automotive Products Company Limited, Leamington Spa, England Application September 24, 1941, Serial No. 412,182
In Great Britain December 31, 1940

6 Claims. (Cl. 188—152)

This invention relates to braking systems for vehicles and has for its object to provide a system of the kind having a source of fluid pressure on the vehicle which is employed to assist the manual operation of the brakes, in which some of the brakes remain operative in the event of failure of any part of the system.

It has previously been proposed to provide a braking system in which a hydraulic master cylinder has its piston operated by fluid pressure (gas or liquid) generated by a pump driven by the vehicle transmission, the application of such pressure to the master cylinder piston being controlled by a valve operated by the driver of the vehicle.

According to the present invention it is proposed to provide a vehicle braking system in which a hydraulic master cylinder operates from the brakes on a vehicle and is itself operated by a fluid pressure motor device, while other brakes of the same vehicle are operated directly from the source which supplies the motor device so that a failure in a portion of the fluid pressure system will cause only a partial failure in the braking system, a satisfactory safety factor being so provided.

To the above ends, this invention contemplates a vehicle braking system in which the movement of a control by the operator to actuate a master cylinder, feeding liquid to wheel cylinders and operating some of the brakes, causes fluid pressure to be applied to a motor device acting upon the master cylinder to assist the operation thereof, and, at the same time, causes fluid pressure from the source which supplies the motor device to be applied directly to the wheel cylinders operating other brakes on the vehicle.

Other objects and advantages of the invention will be apparent upon a consideration of the following detailed description of several embodiments thereof in connection with the annexed drawings wherein:

Figure 2 is an enlarged sectional elevation of the master cylinder with its operating means;

Figures 3 and 4 are similar views of an alternative arrangement; and

Figure 1:
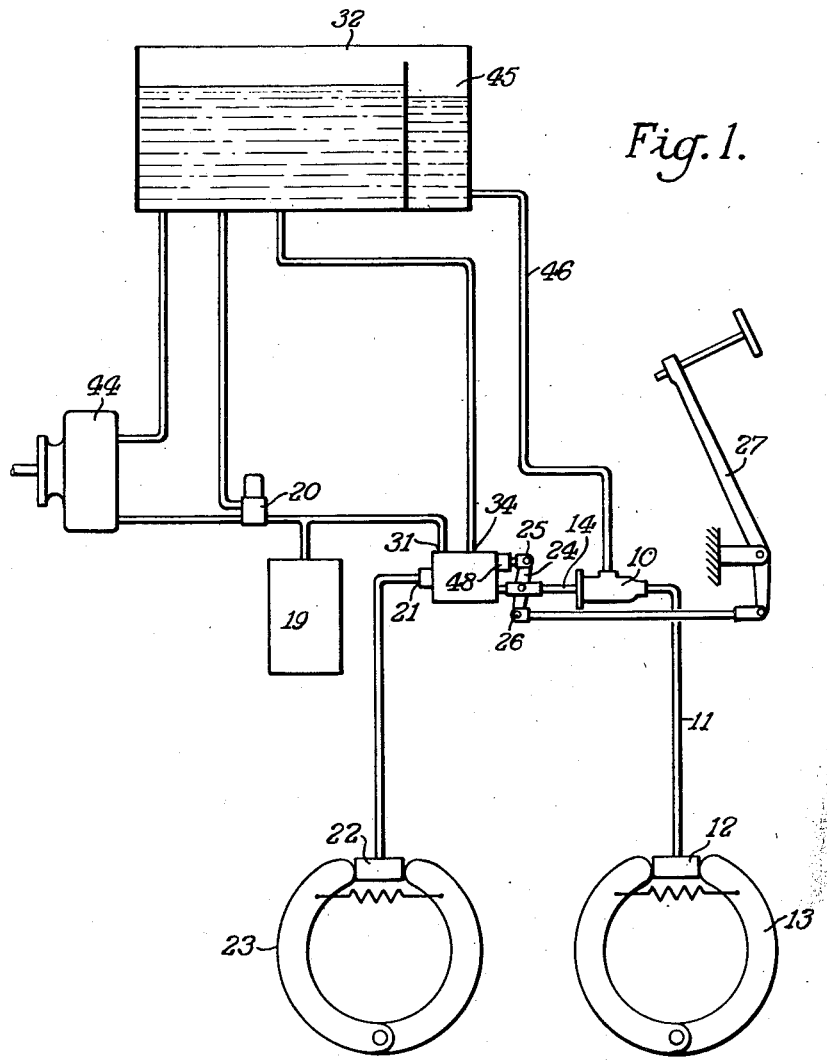
Figure 1 shows one form of brake system.

In the form of braking system illustrated in Figures 1 and 2, a liquid pressure master cylinder 10 connected by pipe-lines as 11 to wheel cylinders, one of which is shown at 12, actuating brake shoes 13 on the rear wheels of a vehicle, has its piston operated by a thrust rod 14, the other end of which abuts on a piston 15 in a motor cylinder 16 mounted coaxially with the master cylinder. A valve housing 17 is formed integral with the motor cylinder 16 and contains a valve 18 controlling the connection between the motor cylinder 16 and a liquid pressure accumulator 19, and an outlet 21 from the motor cylinder leads to wheel cylinders (one of which is shown at 22) actuating brake shoes 23 on the front wheels of the vehicle. A lever 24 pivotally mounted at its centre intermediate the ends of the thrust rod 14 is coupled at one end 25 to the valve 18 and at the other end 26 to the operating pedal 27, the arrangement being such that a pull applied to the end 26 of the lever 24 applies a thrust to the master cylinder piston and also a thrust in the opposite direction to the valve 18. The valve 18 is mounted in a bore 28 lying parallel to the motor cylinder bore and having a central reduced portion 29 into which leads an inlet port 31, the larger portions of the bore 28 at each end of the reduced portion being connected respectively to the motor cylinder 16 and to a liquid reservoir 32 through ports 33 and 34. The valve comprises a plunger mounted in the reduced portion 29 of the bore, the plunger having a frusto-conical head 35 seating on the end of the reduced portion 29 nearer to the motor cylinder connection, a circumferential groove 36 immediately behind the head and registering with the inlet port 31, and a tail portion 37 which has a sliding fit in the reduced bore 29. A passage 38 extends axially through the valve member 18, to connect the motor cylinder to the exhaust port 34, and this passage 38 is adapted to be closed by a cup-like plunger 39 slidable in the larger part of the valve bore with its open end nearer the valve, the cup-like plunger 39 having an internally chamfered lip 41 which engages with the peripheral edge of the tail end of the plunger 18. The cup-like plunger 39 forms the thrust member for operating the valve plunger and between the two parts is a spring 42 urging them apart. A somewhat stronger spring 43 urges the frusto-conical valve heat on to its seat. It will be evident that the valve member 18 is at all times balanced with respect to the fluid pressure, since in all positions it has opposed surfaces of equal area exposed to pressure. Pressure for operating the brakes is stored in the pressure accumulator 19 fed by a pump 44 driven by the vehicle transmission, the accumulator 19 being connected to the inlet port 31 of the valve. A cut-out valve 20 of known type is provided to control the supply of pressure fluid to the accumulator. The fluid is preferably a liquid such as oil or one of the various liquid mixtures customarily used in liquid pressure brake systems.

The master cylinder 10 is of the well-known type in which, when the piston is fully retracted, the system is in communication with a reservoir, which, as shown, is a separate portion 45 of the main reservoir and is connected to the master cylinder by a pipe 46.

The valve member 18 is normally maintained by its loading spring 43 with its head in contact with the seat, the cup-like plunger 39 being held away from the valve member by the lighter spring 42. The pressure is thus cut off from the motor cylinder 16 and the latter is open to the exhaust, so that no pressure is maintained in the motor cylinder. If the brake pedal is operated, it tends to move the master cylinder piston forwardly to apply the brakes and also to open the valve 18 and as the resistance in the master cylinder is greater than that of the valve the lever 24 pivots about its attachment to the thrust rod 14 and after bringing the cup-like plunger 39 into engagement with the valve plunger 18 to cut off the exhaust port 34 opens the valve. Pressure liquid from the accumulator 19 is thus fed to the motor cylinder 16 to move the piston 15 therein and at the same time passes to the wheel cylinders 22 of the front brakes. The actuation of the motor cylinder piston 15 moves the master cylinder piston to apply pressure to the wheel cylinders 12 of the rear brakes and thus all the brakes are operated simultaneously. The movement of the motor cylinder piston 15 and master cylinder piston with the interposed thrust rod 14 tends to return the valve member 18 to its closed position and thus the brakes are applied to a degree dependent solely upon the degree of movement of the pedal 27 and are fully under the control of the operator, the thrust rod moving until it reaches a position in which the head of the valve 18 has just engaged its seat, but the exhaust valve has not opened. Upon releasing the pedal the exhaust valve is opened and the brakes are released.

Should the pump or accumulator fail, the operation of the valve will not bring the fluid pressure into action. The movement of the rod 47 which operates the valve 18 from the lever 24 is limited by a stop 48 so that after such limited movement it is arrested and the lever 24 can fulcrum about its end 25 to apply a direct thrust to the master cylinder piston, thus operating the rear brakes. Should the master cylinder or the system coupled to it fail, the piston therein moves to the full extent of its available travel ineffectively but the travel of the pedal 27 is so arranged that there is still sufficient movement to actuate the valve 18 and bring the fluid pressure into play to operate the front brakes. Thus, if either part of the system fails there are still available brakes to stop the vehicle.

Gas pressure may be used if preferred, instead of liquid pressure, the gas (normally air) being compressed by a convenient compressor driven by the vehicle engine or transmission and stored in a suitable reservoir.

In the alternative form of braking system according to the invention, fluid is circulated continuously by a pump and when the brakes are to be applied a restriction is introduced in the circuit to cause pressure to build up. The master cylinder and accompanying parts may be substantially identical with those described in the specification of application Serial No. 412,191, filed September 24, 1941, now Patent No. 2,318,756, May 11, 1943, a branch connection from the conduit connecting the pump to the inlet port of the cylinder extension being taken to the wheel cylinders of the front brakes.

In the particular example of this form of the invention shown in Figures 3 and 4, a pressure receiving piston 51 is formed integral with the piston 52 of a liquid pressure master cylinder 53 of known type, the master cylinder being connected to wheel cylinders 54 on the rear brakes of the vehicle by means of piping 55. The pressure-receiving piston 51 is slidable in the rear end of the master cylinder 53. From the rear end of the master cylinder there extends a co-axial cylinder 56 of smaller diameter attached in a fluid-tight manner to the master cylinder and in this cylinder is slidably mounted a plunger 57 having an intermediate portion 58 which has a sliding fit in the cylinder 56 and portions 59, 61 of reduced diameter on each side of such intermediate portion, the rear end of the plunger, that is the end remote from the piston 51, being formed with a further enlarged portion 62 carrying a suitable packing ring 63 to make a fluid-tight joint in the cylinder. Two ports 64 and 65 in the wall of the cylinder 56 open one on each side of the intermediate enlarged portion 58 of the plunger, the ports being spaced apart to a sufficient extent to allow the desired stroke of the plunger without the intermediate enlarged portion 58 of the plunger substantially overlapping either of them. The port 64 nearer to the piston 51 is connected by a pipe-line 66 to the delivery outlet of a pump 67 driven from the transmission of the vehicle and the other port 65 is connected to a reservoir 68 from which the pump draws liquid. An axial passage 69 is formed in the plunger 57 from its end near the piston 51 to a point beyond the intermediate enlarged portion where it is intersected by a diametral passage 71 opening into the space 72 around the reduced portion 61 of the plunger. The open end of the axial passage 69 is flared or countersunk as as 73 to provide a valve seat and the piston 51 is formed with a spigot 74 having a frusto-conical end 75 adapted to engage the valve seat 73 and close the passage 69 through the plunger. The rear end of the plunger is recessed at 76 to receive a push-rod 77 connected to a foot-pedal 78 operable by the driver of the vehicle.

The pipeline 66 leading from the pump 67 to the inlet port 64 of the cylinder 56 is branched at 79 to connect with the wheel cylinders 81 on the front brakes of the vehicle, so that pressure is produced in these cylinders at the same time as it is produced in the master cylinder. The master cylinder, which is of the same type as that shown in Figure 2, is connected by a pipeline 82 to a liquid reservoir 83 formed integral with the reservoir 68.

In the inoperative position of the parts, the piston 51 is held against a stop by the usual return spring 84 in the master cylinder and the plunger 57 is in turn urged against a stop ring in the rear end of its cylinder by the liquid pressure acting on its enlarged portion 58. The liquid delivered by the pump 67 therefore flows between the conical end of the spigot 74 and the valve face 73 and through the passages in the plunger 57 to the outlet port 65, no substantial restriction of its passage taking place so that the flow is substantially free and no pressure is built up. When the pedal 78 is depressed, the plunger 57 approaches the piston 51 and the flow of liquid between the plunger and spigot is restricted, so that pressure is built up between the piston 51 and the intermediate enlarged portion 58 of the plunger and in the wheel cylinders 81 of the front brakes. This pressure acts both to urge the piston 51 forwardly to apply the rear brakes and to urge the plunger 57 backwardly against the pressure on the pedal 78, but as the piston has a larger diameter than the plunger a greater total pressure is exerted on the former, a proportional but smaller reaction being transmitted through the plunger to the pedal. It will be evident that with any given pressure on the pedal the liquid pressure will build up to a corresponding limit at which the valve is held open just sufficiently to permit liquid to escape at the same rate as it is delivered by the pump. The degree of braking obtained is thus completely under the control of the driver and the driver can "feel" the degree of braking applied. The removal of pressure from the brake pedal allows the plunger to return and permits the wide opening of the valve, so that the liquid pressure is released and the piston returns to its normal position, thus releasing the rear brakes whilst the liquid can also escape from the front brake wheel cylinders. When the pump is not operating, the pedal pressure is transmitted directly through the plunger 57 to the piston 51, the frusto-conical face 75 of the spigot on the piston coming into engagement with the valve face 73 on the plunger. The rear brakes can thus be operated even though the pump fails. Should the master cylinder system fail, the piston comes up against a stop 85 in the master cylinder and the valve is closed, thus applying pressure to the front brakes.

Figure 5:
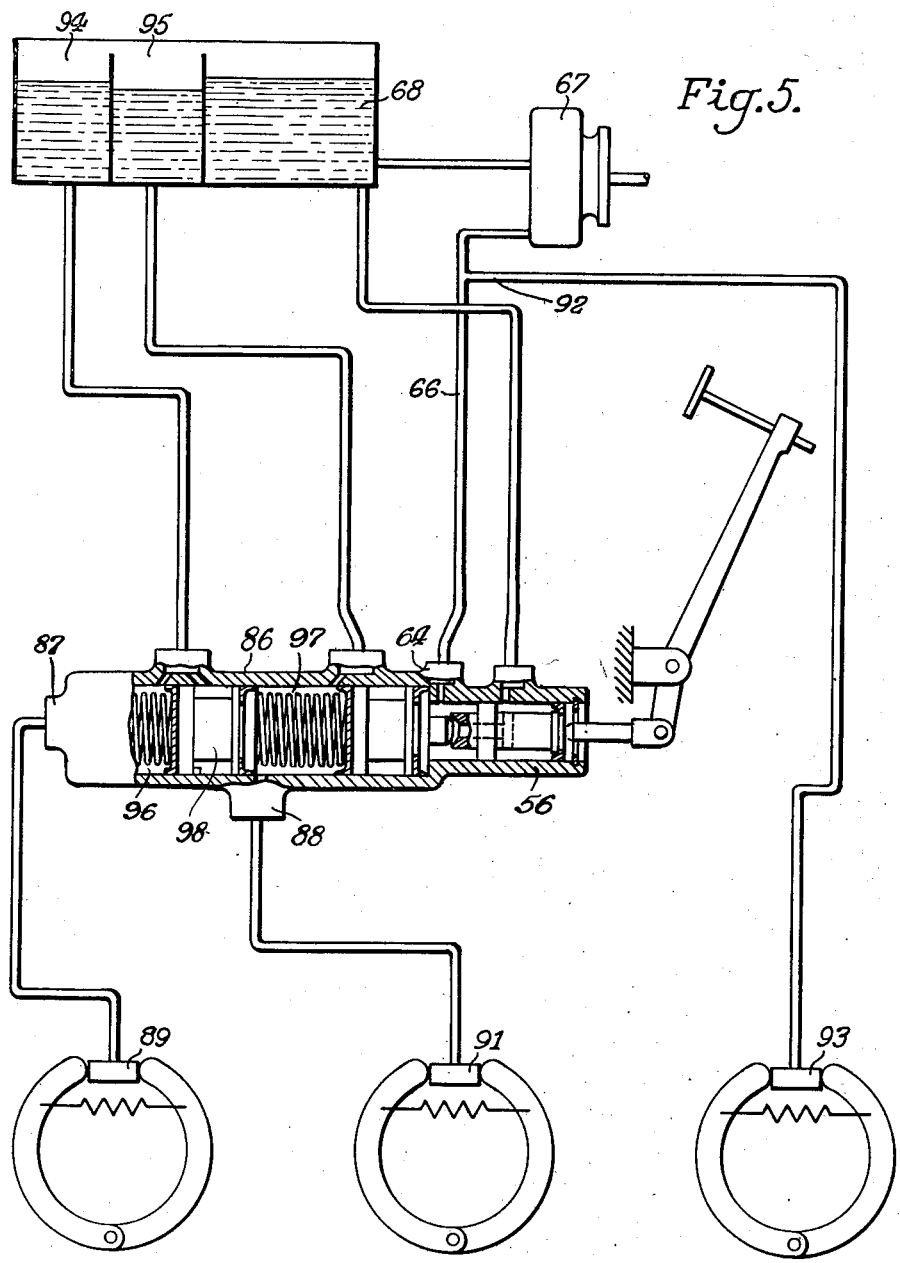
Figure 5 shows a system having a tandem master cylinder.

On a vehicle having more than two pairs of wheels, a master cylinder of the so-called "tandem" or equivalent type may be employed, as shown in Figure 5 at 86. In this type of master cylinder there are two hydraulically independent pressure chambers 96 and 97 separated by a balancing piston 98 or otherwise arranged to provide a common pressure in both of them, the two chambers 96 and 97 of the tandem master cylinder being connected each to wheel cylinders on one or more pairs of wheels, whilst the fluid from the pump or accumulator actuates brakes on one or more other pairs of wheels. Figure 5 illustrates diagrammatically a brake system for a six-wheeled vehicle. The tandem master cylinder 86 has its two outlets 87 and 88 from the chambers 96 and 97 connected respectively to wheel cylinders 89, 91 on two pairs of wheels and is operated by a plunger-and-cylinder device similar to that shown in Figure 4, the cylinder 56 of which is attached to the tandem master cylinder. The pipe 66 leading from the pump 67 to the inlet port 64 on the cylinder 56 is branched at 92 to connect with wheel cylinders 93 on a third pair of wheels of the vehicle. Two auxiliary supply reservoirs 94 and 95 forming compartments of the main reservoir 68 supply the two sections of the tandem master cylinder.

The source of fluid pressure may be a pump or compressor driven by the vehicle transmission and either supplying fluid to a storage vessel such as an accumulator or circulating fluid through a normally unrestricted circuit in which the manually operated valve forms a restriction to cause pressure to be built up. Either a gaseous fluid or a liquid may be employed and in the former case the "source of fluid pressure" is to be construed broadly enough to include an exhauster generating a vacuum and thereby enabling atmospheric pressure to be used to actuate the motor device.

What I claim is:

1. A vehicle braking system comprising a liquid pressure master cylinder, a piston in said master cylinder, wheel cylinders coupled to said master cylinder for actuating brakes on some of the vehicle wheels, a source of fluid pressure, a motor device actuated by fluid pressure from said source thrust means between the motor device and the piston of the master cylinder, wheel cylinders for actuating brakes on other of the vehicle wheels, means coupling said last-mentioned wheel cylinders to the source of pressure in common with said motor device, a manually actuated valve controlling the application of pressure to said motor unit and said last-mentioned wheel cylinders, a control member, connecting means between said control member and said master cylinder piston, connecting means between said control member and said valve having a reaction abutment on the thrust means between the motor device and said piston, and a movement limiting stop for said thrust means to permit said thrust means to act as an abutment for said connecting means in the event of loss of pressure in the master cylinder.

2. A vehicle braking system comprising a liquid pressure master cylinder, a piston in said master cylinder, wheel cylinders coupled to said master cylinder for actuating brakes on some of the vehicle wheels, a source of fluid pressure, a motor device actuated by fluid pressure from said source and acting upon the piston of the master cylinder, wheel cylinders for actuating brakes on other of the vehicle wheels, means coupling said last-mentioned wheel cylinders to the source of pressure in common with said motor device, a manually actuated valve controlling the application of pressure to said motor unit and said last-mentioned wheel cylinders, a control member, a floating lever coupled to said control member, a connection from said floating lever to said valve, a connection from said floating lever to said master cylinder piston, and stops cooperating with each of said connections to provide abutments for said floating lever in the event of failure of the fluid pressure.

3. A vehicle braking system comprising a liquid pressure master cylinder, a piston in said master cylinder, wheel cylinders coupled to said master cylinder for actuating brakes on some of the vehicle wheels, a reservoir for fluid under pressure, a motor device actuated by fluid from said reservoir, and connected by a thrust rod to the piston of the master cylinder, a valve adapted to at times connect said motor device to said reservoir, a two armed lever, a pivot for said lever on the thrust rod, a connection from one arm of said lever to the valve, a connection from the other arm of said lever to a control member, wheel cylinders for actuating brakes on other of the vehicle wheels, and means coupling said last-mentioned wheel cylinders to the reservoir in common with said motor device to receive pressure simultaneously with said motor device under the control of the manually actuated valve.

4. A vehicle braking system comprising a liquid pressure master cylinder, a piston in said master cylinder, wheel cylinders coupled to said master cylinder and actuating brakes on some of the vehicle wheels, a fluid circuit including a pump and a normally open manually actuated valve, a motor device acting upon the piston of the master cylinder, wheel cylinders for actuating brakes on other wheels of said vehicle, said motor device and said last mentioned wheel cylinders being each connected to said fluid circuit between the pump delivery and the valve, and control means for at times reducing the opening of said valve to build up pressure in the circuit to actuate the motor device and wheel cylinders.

5. A vehicle braking system according to claim 4, wherein the motor device comprises a piston integral with the master cylinder piston and operating in the master cylinder bore.

6. A vehicle braking system comprising a liquid pressure master cylinder, a piston in said master cylinder, brakes on some of the vehicle wheels, wheel cylinders actuating the braking elements of said brakes, conduit means connecting said master cylinder to said wheel cylinders, a reservoir for fluid under pressure, a motor device actuated by fluid from said reservoir and acting upon the piston of the master cylinder, brakes on other of the vehicle wheels, wheel cylinders actuating the braking elements of said last-mentioned brakes, a manually actuated valve which comprises a plunger, means defining a bore to receive said plunger, said bore having a constriction through which the plunger passes, a head on one end of the plunger adapted to seat on one defining end of the said constriction, said plunger having an annular recess immediately adjacent said head, an inlet port in said means defining a bore connected from said reservoir and opening into the restricted part of the bore, the annular recess in said plunger registering at all times with said port, said valve plunger having a longitudinal passage therethrough, an exhaust port in communication with the end of said plunger remote from said head, an auxiliary plunger having a cup-shaped end adapted to engage with the outer edge of the main plunger at the end thereof remote from the plunger head, to cover the passage through the said plunger and isolate the motor cylinder from the exhaust port, and conduits connecting the end of the means defining a bore remote from the end thereof having the auxiliary plunger therein to the last mentioned wheel cylinders and to said motor device, whereby said valve controls the supply of pressure fluid from said reservoir to both the motor device and the last mentioned wheel cylinders.

FRANK GORDON PARNELL.